July 26, 1949.    H. HUTCHINGS    2,477,252
AGRICULTURAL TRACTOR

Filed Nov. 29, 1946    2 Sheets-Sheet 1

Inventor
Herschel Hutchings,

By J. Stanley Burch
Attorney

July 26, 1949.   H. HUTCHINGS   2,477,252
AGRICULTURAL TRACTOR
Filed Nov. 29, 1946   2 Sheets-Sheet 2
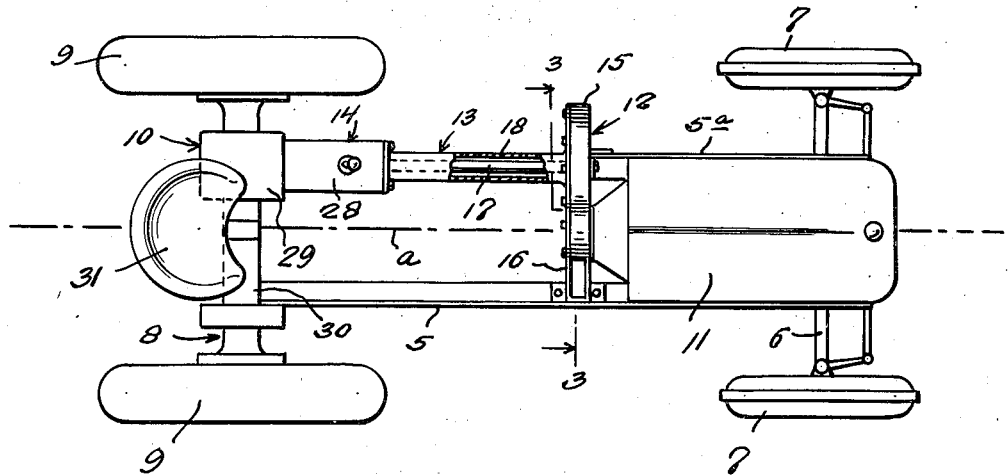
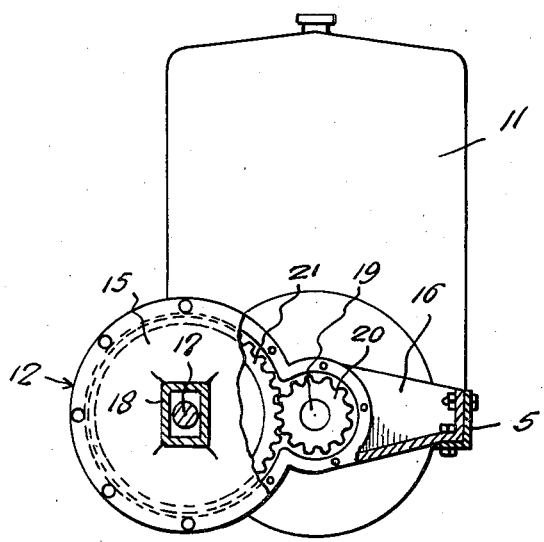
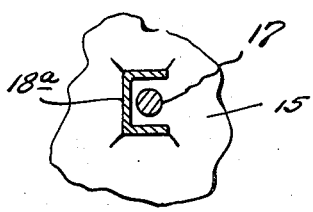
Inventor
Herschel Hutchings,
By J. Stanley Burch
Attorney Patented July 26, 1949

2,477,252

UNITED STATES PATENT OFFICE 2,477,252

AGRICULTURAL TRACTOR

Herschel Hutchings, Lubbock, Tex.

Application November 29, 1946, Serial No. 712,796

3 Claims. (Cl. 180—1.5)

This invention relates to an improved agricultural tractor of that type wherein provision is made so that the driver may view the ground between the sides and immediately ahead of the rear axle assembly of the tractor.

In using small tractors of the four-wheel type adapted for one-row operation, the row being operated upon passes centrally beneath the tractor. The present invention relates to a tractor of this type, and the primary object of the invention is to construct such a tractor so as to provide for simplicity and durability and to give unobstructed vision of the row being operated upon between the sides and between the power plant and the rear axle assembly of the tractor.

More particularly, the present invention relates to an improvement in the construction shown in my U. S. Letters Patent No. 2,404,442, dated July 23, 1946, whereby the propeller shaft housing element, the transmission housing element, and the casing of a gearing between the power plant and a shaft of one of said elements form part of one side frame member of the tractor.

The exact nature of the present invention will become apparent from the following description when considered in connection with the accompanying drawings, in which:

Figure 2 is a top plan view thereof, partly broken away and in section.

Figure 3 is an enlarged transverse section taken on the line 3—3 of Figure 2.

Figure 6 is a fragmentary view like part of Figure 3, showing a modification of the propeller shaft housing element.

Figure 1:
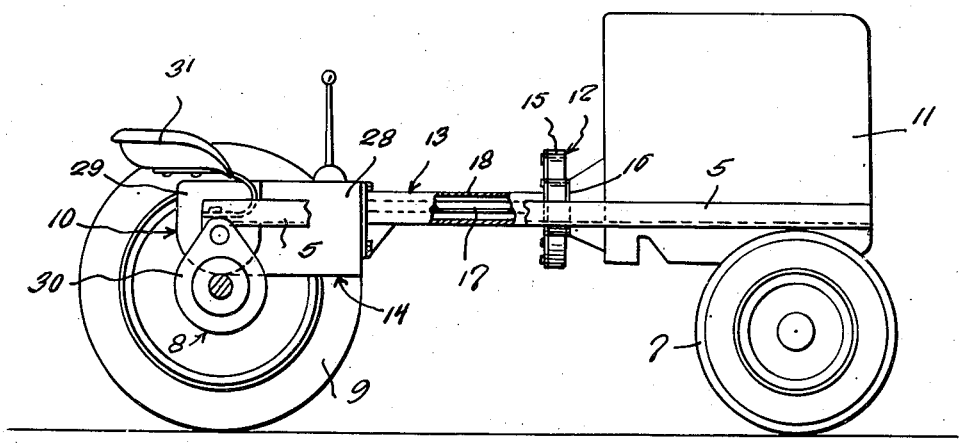
Figure 1 is a view, partly in side elevation and partly in section, of a tractor constructed in accordance with the present invention.

Referring in detail to the drawings, the embodiment of the present invention shown in Figures 1 to 3 inclusive includes a complete side frame rail 5 and a partial front side frame rail 5a supported at their forward ends on a front axle 6 having front steering and supporting wheels 7. The complete side frame rail is supported at its rear end by a rear axle assembly 8, the rear axles of which are equipped with rear driving and supporting wheels 9, and the differential structure 10 being offset to that side of the longitudinal center line a of the tractor at which the partial front side frame rail 5a is located.

A power plant 11 is supported by the forward portion of complete rail 5 and the partial rail 5a centrally between the front wheels 7. The gearing of a gearing structure 12, the shaft of a propeller shaft structure 13, and the gearing of a transmission structure 14 operatively connect the power plant 11 with the gearing of the differential structure 10.

Figure 4:
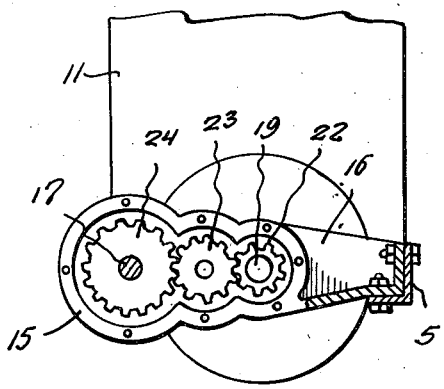
Figures 4 and 5 are views somewhat similar to Figure 3, showing modifications of the gearing between the power plant and the propeller shaft.
Figure 5:
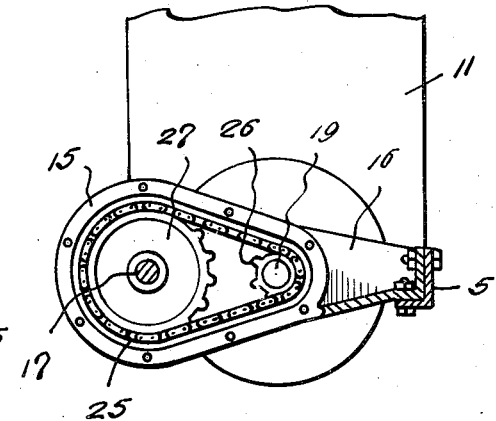

As shown, the gearing structure 12 includes a casing 15 fixed to the rear end of the partial side frame rail 5a and including a bracket 16 disposed upon and fixed to the complete side frame rail 5. The propeller shaft structure includes a propeller shaft 17 and a housing element 18 for said shaft 17 fixed at its forward end to the casing 15. The structure 12 further includes a gearing within the housing 15 operatively connecting the drive shaft 19 of power plant 11 to the propeller shaft 17. This gearing may include intermeshing gears 20 and 21 respectively secured on the shafts 19 and 17 as shown in Figure 3, a train of gears 22, 23 and 24 as shown in Figure 4, or a sprocket chain 25 passing around sprocket wheels 26 and 27 as shown in Figure 5. The gears 22 and 24 are respectively secured on the shafts 19 and 17, and the gear 23 is an idler disposed between and meshing with the gears 22 and 24. The sprocket wheels 26 and 27 are respectively secured on the shafts 19 and 17. The housing element 18 is a tube, but a channel 18a may be used instead as shown in Figure 6.

As shown, the transmission structure 14 includes a housing element 28 having the rear end of the housing element 18 fixed to the front thereof and formed on the front of the housing element 29 of the differential structure 10, said housing element 29 being supported on the housing element 30 of the rear axle assembly 8. However, the structure 14 may be interposed between the structures 12 and 13 or between sections of the structure 13, if desired.

It will be seen that the housing elements of structures 12, 13, 14, and 10 coact with partial rail 5a to provide one side frame member of the tractor.

A driver's seat 31 is supported on the assembly 8 centrally between the rear wheels 9, and it will be apparent that the driver occupying seat 31 may clearly view the row or the ground along the center line a between the frame rail 5 and the structures 13 and 14 directly in front of the structure 8 or between the latter and the power plant 11.

The construction is quite simple and durable, and effectively carries out the stated objects of the invention.

What I claim is:

1. An agricultural tractor comprising a front axle having front steering and supporting wheels, a complete side frame rail and a forward partial side frame rail supported at their forward ends on said front axle, a rear axle assembly supporting the rear end of said complete side frame rail and having rear driving and supporting wheels on the axles thereof, a differential structure supported on said rear axle assembly, and offset to that side of the longitudinal center of the tractor at which the partial side frame rail is located, a power plant supported by the forward portion of the complete side frame rail and the forward partial side frame rail, a gearing structure, a propeller shaft structure, a transmission structure, all of said structures including housings, one housing fixed to the rear end of the partial side frame rail and each of said housings fixed to another to form with the forward partial side frame rail a complete side frame member, said structures including serially connected gearings and shafts operatively connecting the power plant to the rear axles, and a driver's seat at the rear of the tractor between the rear wheels, the space between the power plant and the rear axle assembly and between the rear portion of the complete side frame rail and the transmission and propeller shaft structures being unobstructed.

2. The construction defined in claim 1, wherein the gearing of the gearing structure operatively connects the power plant with the propeller shaft, and wherein the housing of said gearing structure is fixed to the rear end of the partial side frame rail.

3. The construction defined in claim 1, wherein the gearing of the gearing structure operatively connects the power plant with the propeller shaft, and wherein the housing of said gearing structure is fixed to the rear end of the partial side frame rail, the transmission structure being interposed between the differential and propeller shaft structures.

HERSCHEL HUTCHINGS.

REFERENCES CITED

The following references are of record in the file of this patent:

UNITED STATES PATENTS

| Number | Name | Date |
|---|---|---|
| 2,187,425 | Johnston | Jan. 16, 1940 |
| 2,232,154 | Wagner | Feb. 18, 1941 |
| 2,247,668 | Rosenthal | July 1, 1941 |
| 2,375,026 | Mott | May 1, 1945 |
| 2,404,442 | Hutchings | July 23, 1946 |